United States Patent
Venton-Walters et al.

(10) Patent No.: US 6,918,721 B2
(45) Date of Patent: Jul. 19, 2005

(54) RECESSED DEMOUNTABLE CARGO TIE DOWN

(75) Inventors: Roy Venton-Walters, Neshkoro, WI (US); Allen C. Hedeen, Oshkosh, WI (US); Peter D. Breyer, Neenah, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 0 days.

(21) Appl. No.: 10/438,422

(22) Filed: May 15, 2003

(65) Prior Publication Data

US 2004/0228699 A1 Nov. 18, 2004

(51) Int. Cl.⁷ .................................................. B60P 7/08
(52) U.S. Cl. ...................... 410/102; 410/106; 410/107; 410/111
(58) Field of Search ......................... 410/102, 106–108, 410/110, 111, 116; 24/265 CD, 115 K; 248/499

(56) References Cited

U.S. PATENT DOCUMENTS

| | | | |
|---|---|---|---|
| 2,756,693 A | 7/1956 | Frost | |
| 3,377,039 A | 4/1968 | Hayes | |
| 3,412,693 A * | 11/1968 | Lewis | 410/111 |
| 3,893,399 A | 7/1975 | Lewis et al. | |
| 4,699,410 A | 10/1987 | Seidel | |
| 4,715,754 A * | 12/1987 | Scully | 410/107 |
| 4,850,769 A * | 7/1989 | Matthews | 410/105 |
| 4,907,921 A | 3/1990 | Akright | |
| 5,180,263 A | 1/1993 | Flowers, Jr. | |
| 5,774,948 A | 7/1998 | Petschke et al. | |
| 6,065,917 A * | 5/2000 | Shambeau et al. | 410/107 |
| 6,142,718 A * | 11/2000 | Kroll | 410/106 |
| 6,196,777 B1 * | 3/2001 | Price | 410/102 |
| 6,213,696 B1 | 4/2001 | Austin | |

* cited by examiner

*Primary Examiner*—Stephen Gordon
(74) *Attorney, Agent, or Firm*—Foley & Lardner LLP

(57) ABSTRACT

The invention generally relates to an assembly for securing cargo to a cargo bed. Specifically, the invention relates to a cargo tie-down for mounting in the cargo deck of a vehicle. The recessed cargo tie-down includes a housing recessed within the cargo deck of a vehicle, an anchor defining an aperture secured within the housing, and a tie-down ring having a nominally circular portion and at least one nominally straight portion compatible with flat metal banding. According to the exemplary embodiment, the tie-down ring is attached to the recessed housing through the aperture in the anchor such that the tie-down ring may be rotated along its periphery within the aperture such that either the nominally circular portion or the nominally straight portion is within the aperture.

20 Claims, 4 Drawing Sheets

RECESSED DEMOUNTABLE CARGO TIE DOWN

BACKGROUND OF THE INVENTION

The present invention relates generally to the field of assemblies used to secure cargo. More particularly, the invention relates to a tie-down assembly used to secure cargo in place in or on a vehicle, trailer or container.

Various types and sizes of cargo are transported from a point of origin or an intermediary point to a destination. Independent of the type of transportation that is used to transport the cargo, the cargo can be subjected to a wide variety of forces from a wide variety of directions. Accordingly, it is important that the cargo be properly secured to whatever type of transportation is used to transport it. Traditionally, a variety of type of cargo tie-downs have been used to secure cargo.

The attachment points for cargo tie downs on load carrying vehicles are designed to retain the cargo safely in place during the operation of the vehicle. These tie-downs can be designed to hold the cargo securely and withstand the application of forces occurring during transportation.

For example, for commercial on-highway trucks of the flat-bed type, there are currently many different cargo securing systems commercially available, the most common being separate webbing straps terminating in "rave hooks" which hook on to the turned-in lower flange of the vehicle's chassis rails or the lower outboard edges of the cargo bed as their primary attachment points. The securing straps attach to the main chassis rails on one side, pass over and bear against the side edge of the cargo bed, over the cargo to be secured, over the opposite side edge of the cargo bed and attach to the lower chassis rail flange on the opposite side. Alternatively, the side edges of the cargo-bed have been used to secure the tie-down load. Where the side edges are used, the straps are hooked on one side of the bed, pass over the cargo to be secured, and attach to the other side of the bed.

On trucks or trailers fitted with side-boards of the fixed or drop-down type, the use of the chassis rails or cargo-bed edges as anchor points for tie-down straps can be inhibited by the presence of the sides. Moreover, on some trucks there may be no ready access to permit the frame rails to be used as anchor points. This is particularly true of military cargo trucks since the space adjacent to the chassis rails may be occupied by ancillary equipment such as winches, filters, fuel and hydraulic tanks and equipment storage. In such cases it is common practice to have a number of fixed tie-down anchor points on, or recessed into the cargo bed deck.

Contemporary practice relating to the restraint of cargo on military trucks differs from commercial on-highway practice. The loads imposed during operation of military trucks is often significantly higher than for commercial practice. During rapid off-road operation military trucks may have to sustain repeated vertical, lateral and longitudinal accelerations to the accepted limits of the driver's ability to endure them. Additionally, during ship-borne deployment, the loaded vehicle is chained down and can be subjected to high vertical accelerations and lateral accelerations in excess of the vehicle's normal lateral stability limits. Additionally, during transport of loaded vehicles by rail freight, a loaded vehicle can be subjected to longitudinal accelerations approaching 4g during automatic rail-car sorting which is conducted on a down grade—the so called "Rail Hump" condition. Because of these load cases, military cargo tie-downs are often required to satisfy more stringent specifications than those typically applied to commercial highway operation.

A number of types of recessed tie down assemblies for mounting in cargo-bed decks have traditionally been used. Traditional tie-down assemblies commonly have included a welded assembly that precludes the replacement of a damaged tie-down ring or bail by the use of normal hand tools. Traditional tie-down assemblies have also defined a space through the ring or bale that is insufficient to accept some of the hooks, chains and tie-down fittings in common use today. Additionally, traditional tie-down assemblies have not had the capability to accept wide metal banding as an optional tie-down medium.

Additionally, for traditional tie-down assemblies, during loading and positioning of the cargo by sliding, tie-down rings are kept folded in their recessed pockets in order to permit a fork-lift loading operation without risk of unnecessary damage to the tie-downs or cargo. The tie-down rings can be swung upwards to attach the tie-down straps or banding after loading is complete. However, if the cargo were to be placed over the folded-down edge of any of the tie-down rings, the rings can not be raised up for use and the tie-downs can be rendered inoperative. Because of the restriction this imposes while loading cargo, the usable width of the cargo-bed, especially for palletized or boxed cargo, is the width measurement between the innermost edges of the folded tie-down rings on opposite sides of the cargo-bed. The full width of the cargo bed or at least the width between tie-down ring pivot centers can not be utilized.

What is needed is a tie-down assembly that can be efficiently and inexpensively produced. What is further needed is a tie-down assembly whose parts can be easily removed and replaced. What is further needed is a tie down assembly including an aperture that is sufficiently sized to accommodate a variety of securing devices. What is yet further needed is a tie-down assembly that provides the capability of using traditional lashings or other lashings, such as wide metal banding to secure the load.

SUMMARY OF THE INVENTION

One exemplary embodiment of the invention relates to a recessed cargo tie-down. The cargo tie-down includes a housing recessed within the cargo deck of a vehicle, an anchor defining an aperture secured within the housing, and a tie-down ring having a nominally circular portion and at least one nominally straight portion compatible with flat metal banding. According to the exemplary embodiment, the tie-down ring is attached to the recessed housing through the aperture in the anchor such that the tie-down ring may be rotated along its periphery within the aperture such that either the nominally circular portion or the nominally straight portion is within the aperture.

Another exemplary embodiment of the invention relates to a cargo bed for a vehicle including at least one recessed cargo tie down. The cargo bed for a vehicle includes a cargo bed including at least one aperture for receiving a recessed cargo tie-down and the recessed cargo tie-down secured within the aperture in the cargo bed. The recessed cargo tie-down further includes a housing recessed within the cargo deck of a vehicle, an anchor defining an aperture secured within the housing, and a tie-down ring having a nominally circular portion and at least one nominally straight portion compatible with flat metal banding. The tie-down ring is attached to the recessed housing through the aperture in the anchor such that the tie-down ring may be rotated along its periphery within the aperture such that either the nominally circular portion or the nominally straight portion is within the aperture.

Another exemplary embodiment of the invention relates to a recessed cargo tie-down. The cargo tie-down includes a tie-down ring having a nominally circular portion and at least one nominally straight portion compatible with flat metal banding and an anchoring means for anchoring the tie-down ring to the cargo deck of a vehicle such that the tie-down ring may be rotated along its periphery to alternatively present the nominally circular portion or the nominally straight portion external to the anchoring means.

Another exemplary embodiment of the invention relates to a recessed cargo tie-down. The recessed cargo tie down includes a housing for mounting within a cargo deck of a vehicle, a ring having a nominally circular portion and at least one nominally straight portion, and a member for securing the ring to the housing such that either portion can be engaged by a lashing.

DETAILED DESCRIPTION OF THE PREFERRED EMBODIMENTS

Figure 1:
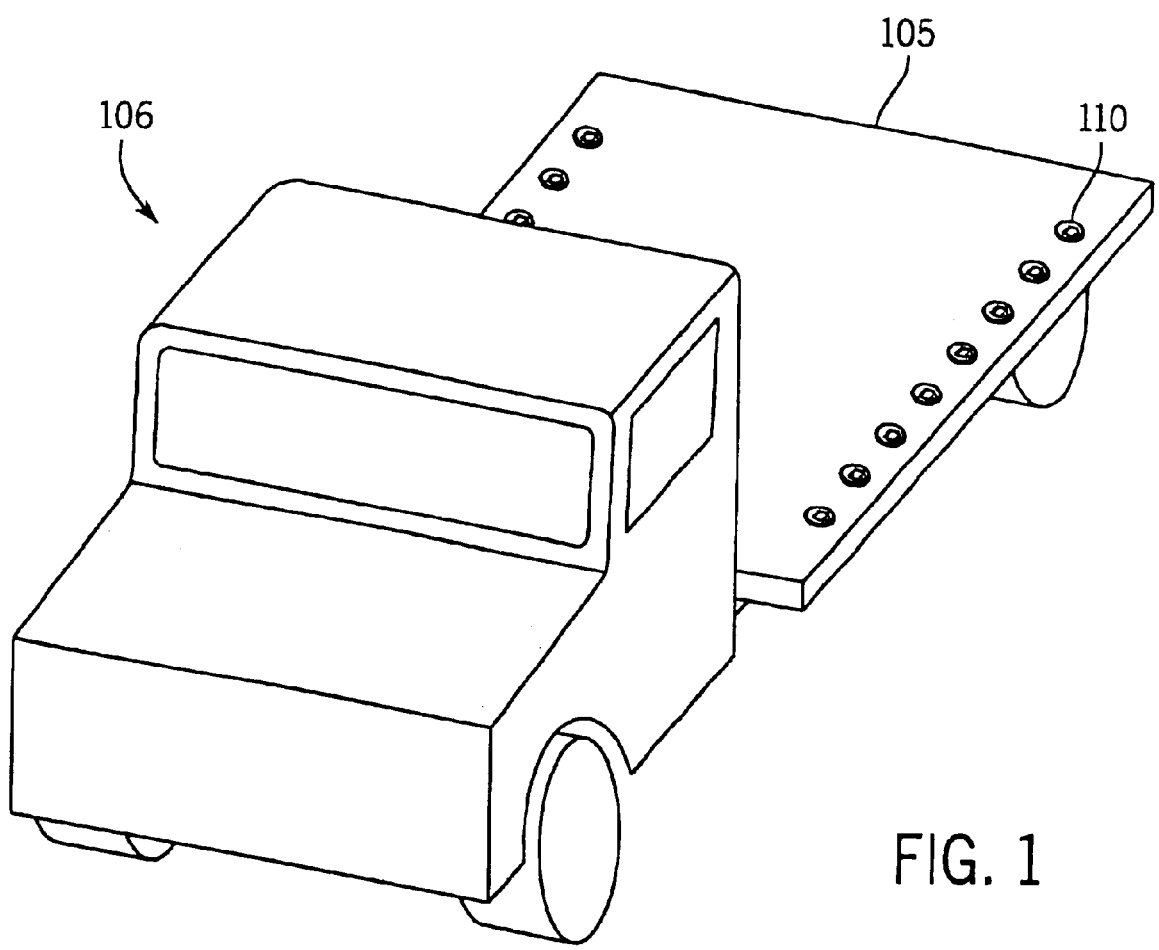
FIG. 1 is a vehicle including a flatbed portion including a plurality of recessed demountable cargo tie down assemblies.

Referring to FIG. 1, FIG. 1 is a perspective view of a flatbed truck 100 including a plurality of recessed demountable cargo tie-downs 110 according to an exemplary embodiment. Although flatbed truck 100 is shown as an example of a cargo carrying vehicle, recessed demountable cargo tie-downs 110 can be installed for use on any type of transportation used for carrying cargo. Examples can include a rail car, an airplane, a ship, etc.

Flatbed truck 100 includes a cargo deck 105, shown as the flatbed portion of flatbed truck 100, for receiving and securing cargo. Flatbed truck 100 further includes a plurality of recessed demountable cargo tie-downs 110 positioned in cargo deck 105. The plurality of recessed demountable cargo tie-downs 110 are shown positioned along the left and right sides of cargo deck 105 of flatbed truck 100. The plurality of recessed demountable cargo tie-downs 110 can include as many or as few recessed demountable cargo tie-downs 110 as is needed to secure any cargo to be carried on flatbed truck 100. Additionally, the plurality of recessed demountable cargo tie-downs 110 can be positioned in any of a variety of configurations as needed to secure any cargo to be carried on flatbed truck 100.

Figure 2:
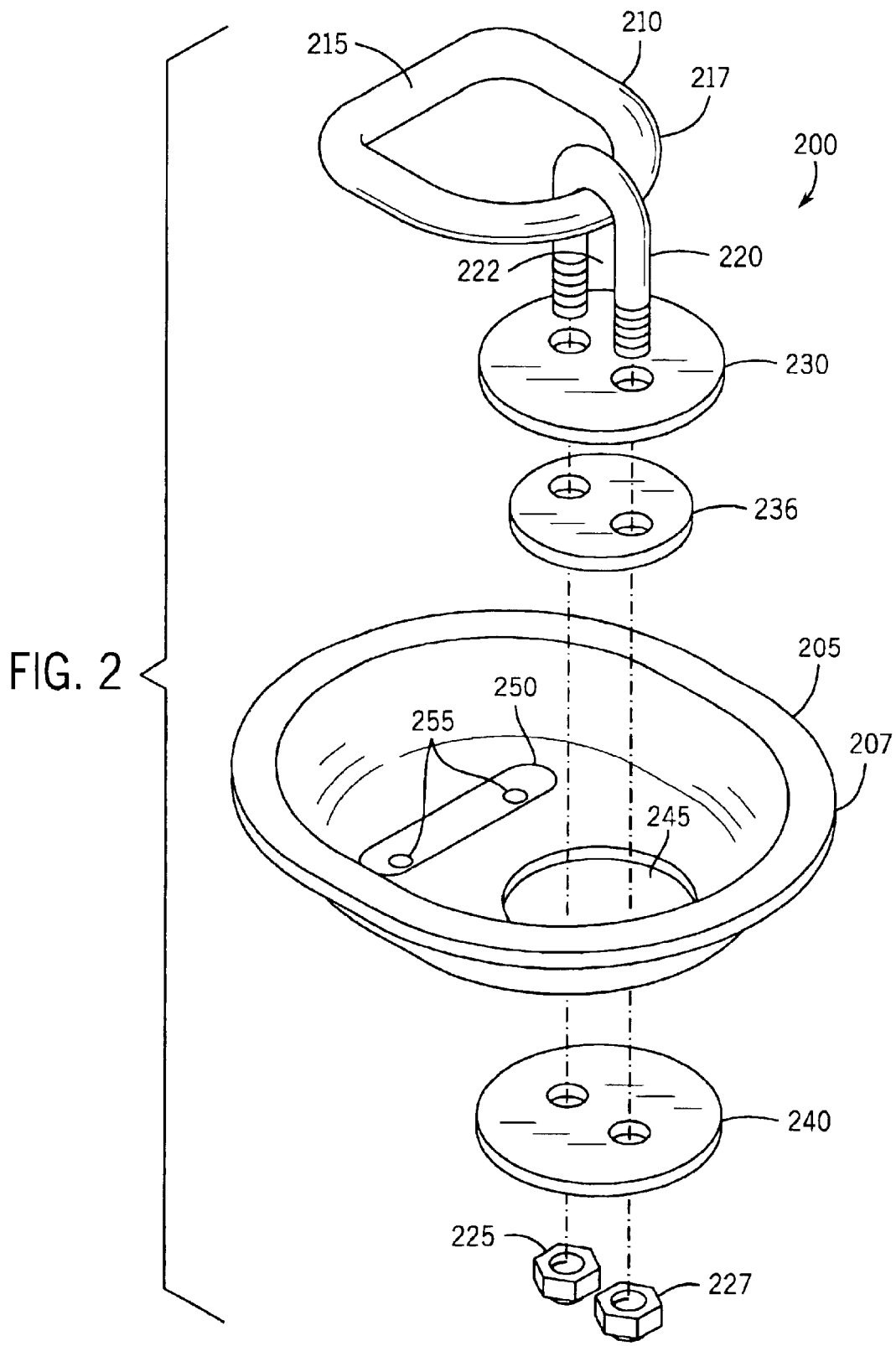
FIG. 2 is an exploded view of a recessed demountable cargo tie down assembly according to an exemplary embodiment.

Referring to FIG. 2, FIG. 2 is an exploded view of a tie down assembly 200 according to an exemplary embodiment. The assembly includes a mounting cup 205 configured to be recessibly attached into a cargo deck and/or its supporting structure, a tie-down ring or bail 210 having a nominally straight portion 215 and a curved portion 217 to form essentially a "D" shape, a U-bolt 220 defining an aperture 222, two U-bolt retaining nuts 225 and 227, an upper U-bolt constraining washer 230, a middle U-bolt constraining washer 235 and a lower U-bolt constraining washer 240.

Recessed cup 205 can be any type of housing formed from any of a variety of materials. Recessed cup 205 can be sized to accommodate tie-down ring 210 when tie-down ring 210 is positioned in the folded down position. Recessed cup 205 can further have sufficient depth to ensure that both tie-down ring 210 and retaining U-bolt 220 in the folded down position remain flush, or below flush, with the cargo deck surface. Cup 205 can be furnished with a hole 245 sized as a clearance fit over the mid U-bolt washer 235.

Cup 205 can further include a reinforcing and drainage channel 250 impressed across the width of the floor of recessed cup 205 to increase the strength and rigidity of the floor of cup 205 according to an exemplary embodiment. Increasing the strength and rigidity of the floor of cup 205 permits the use of a lighter gauge material for cup 205 than would otherwise have been needed to secure the tie-down loads.

Concave channel 250 can also serve as a drainage channel for cup 205. Accordingly, concave channel 250 can include drain holes 255 to aid the egress of water, cargo spillage or particulate matter.

The periphery of recessed cup 205 can also include an out-turned flange 207 to facilitate attachment of cup 205 to a cargo deck. Out-turned flange 207 can facilitate welding cup 205 to a cargo deck by presenting a greater surface area to be welded to the cargo deck.

Peripheral out-turned flange 207 additionally functions as a convenient way of reducing the criticality of alignment of recessed cup 205 to the matching aperture in the cargo deck plate during manufacture of the cargo-bed. According to an alternative embodiment, where the alignment is accurate and where the cup can be attached to the deck plate and not necessarily to the supporting structure as well, out-turned flange 207 may be dispensed with, and the upper edge of cup 205 can be welded directly at its abutment to the deck aperture edge.

According to alternative embodiments, the method of attachment of recessed cup 205 to the cargo-deck and/or supporting structure can including attachment by a method other than welding. For example, the described configuration including out-turned flange 207 is also suitable for brazing or bonding recessed cup 205 in position. Alternatively, recessed cup 205 can be attached by bolts, rivets or other fasteners. Recessed cup 205 may be altered appropriately to facilitate the most appropriate method of attachment. For example, the floor, sides or out-turned flange 207 of cup 205 can be furnished with attachment holes.

Tie down ring 210 can be any type of ring that includes a nominally straight portion 215 and a curved portion 217. Ring 210 can be formed from any type of material. According to an exemplary embodiment, ring 210 can be formed from a high tensile steel to resist breaking or deformation under heavy loads.

According to an alternative embodiment, nominally straight portion 215 of the tie-down ring 210, provided to accept flat metal banding, may be slightly curved inward. Curving nominally straight portion 215 inward provides the advantage or helping to ensure that the edges of the metal banding, which can be prone to splitting under load, are not brought forcibly into contact with nominally straight portion 215. Providing a curve in nominally straight portion 215 helps to ensure that the load is applied initially towards the center of the banding. The extent of the curvature of the bar can be arranged so that under maximum permitted load, nominally straight portion 215 is deflected elastically from its curved shape to be essentially straight, under which conditions both nominally straight portion 215 and the banding bear the load evenly without any tendency to excessively strain the banding at its edges and cause it to fail prematurely. A slight curvature in nominally straight portion 215 can be particularly useful where an aluminum alloy tie-down ring is used, since such alloys have a low modulus of elasticity and therefore can significantly elastically deflect under load.

U-bolt anchor 220 can be any type of U-bolt defining an aperture 222 and including threaded ends for receiving U-bolt retaining nuts 225 and 227. U-bolt 220 can be formed from any material sufficient to withstand breakage or deformation under heavy loads. According to an alternative embodiment, U-bolt 220 and associated components can be replaced with any other type of anchor defining an aperture 222 for securing tie-down ring 210.

Figure 4A:
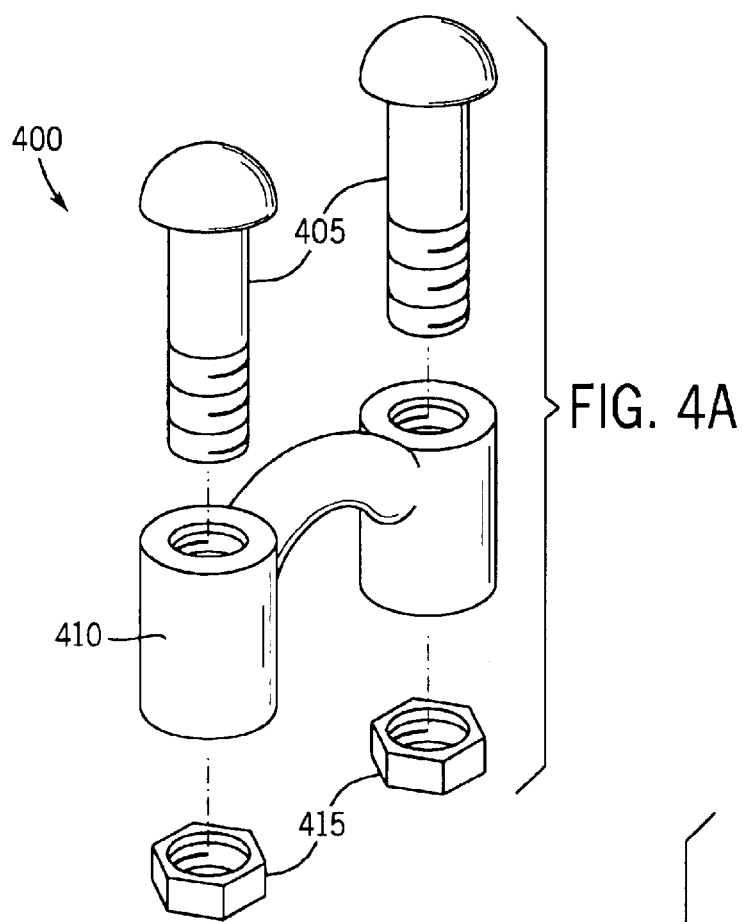
FIG. 4A is an exploded view of a bolt and shackle anchor assembly for a recessed demountable cargo tie down assembly according to an exemplary embodiment.
Figure 4B:
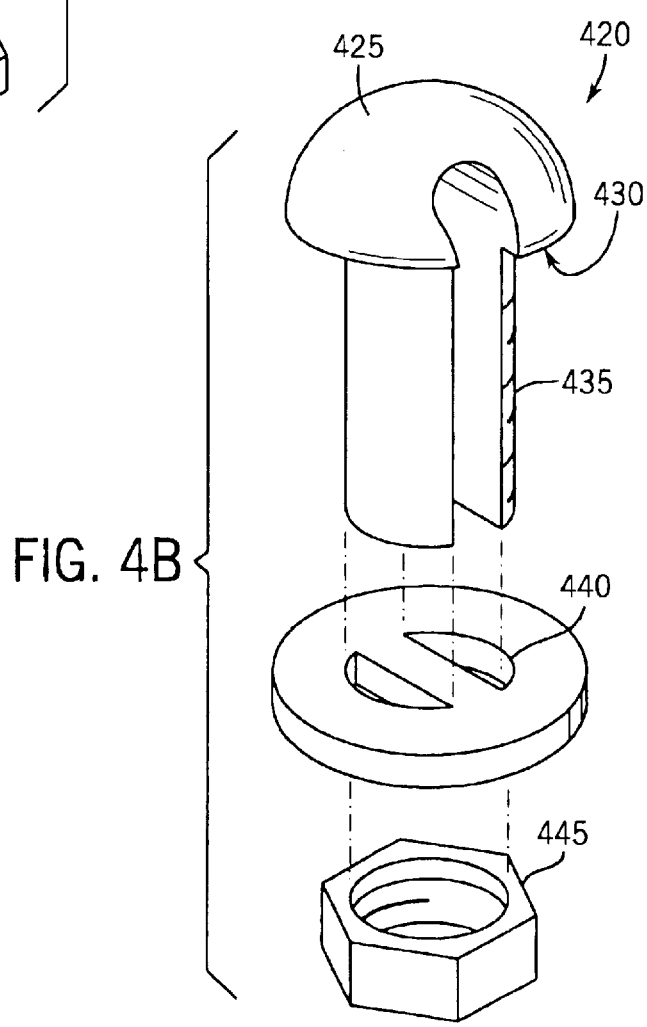
FIG. 4B is an exploded view of a bolt and washer anchor assembly for a recessed demountable cargo tie down assembly according to an exemplary embodiment.

For example, referring now to FIG. 4A, a bolt and shackle assembly 400 is shown according to an alternative embodiment. Bolt and shackle assembly 400 includes bolts 405, a shackle 410 and anchoring nuts 415. Referring now to FIG. 4B, a U-bolt anchor assembly 420 is shown according to another alternative embodiment. U-bolt anchor assembly 420 includes a shackle 425, a shackle flange 430, a bifurcated shaft 435, a bifurcated shaft receiving washer 440 and a locknut 445. Bifurcated shaft 435 is configured to pass through bifurcated shaft receiving washer 440, such that shackle flange 430 abuts bifurcated shaft receiving washer 440. The use of different configurations allows for versatility to meet current needs.

According to an exemplary embodiment, U-bolt 220 is removable in the event of breakage or deformation of U-bolt 220 or to facilitate replacement of tie-down ring 210 in the event of deformation or breakage.

According to an exemplary embodiment, upper U-bolt constraining washer 230 and lower U-bolt constraining washer 240 can be any type of washer configured to have larger outside diameters than hole 245 and be positioned above and below middle U-bolt constraining washer 235 respectively. U-bolt 220 can be passed through the assembled pack of three washers 230, 235 and 240 to attach tie-down ring 210 in place within the cup 205, the edges of recessed cup 205 defining hole 245 can be sandwiched between upper and lower washers 230 and 240 with mid washer 235 acting a spacer within hole 245.

In operation, U-bolt 220 can be secured to cup 205 such that U-bolt 220 can rotate around a primary axis defined as a line extending perpendicular to a plane defined by hole 245. Advantageously, allowing U-bolt 220 to rotate within cup 205 provides adaptability for securing lashings that secure to the tie down ring from a variety of directions.

U-bolt retaining nuts 225 and 227 can be secured to U-bolt 220 to secure the tie-down ring 210 in place within recessed cup 205. U-bolt retaining nuts 225 and 227 can be self locking retaining nuts. According to an exemplary embodiment, U-bolt retaining nuts 225 and 227 are not tightened down fully such that clearance exists between the parts. By securing but not tightening fully U-bolt retaining nuts 225 and 227, the whole tie-down ring, U-bolt and washer pack are constrained in position but free to move rotatably about the primary axis through hole 245. Additionally, tie-down ring or bail 210 is further permitted to move pivotally in angular displacement about a generally horizontal axis through aperture 222 in U-bolt 220. Further, tie-down ring 210 is free to be slid around its periphery through aperture 22 in U-bolt 220.

According to an alternative embodiment, the U-bolt retaining washer pack, consisting of washers 230, 235 and 240 can be replaced with at least one flanged or "top hat" section washer. According to this embodiment, the extension on the flanged or "top hat" section washer can be positioned within hole 245 and replace the function of mid washer 235.

In operation, tie-down ring 210 can be rotated along its periphery within U-bolt 220 to present curved portion 217 not within aperture 222 to accept rope or other essential round lashing along curved portion 217 to secure a load. According to this use, nominally straight portion 215 will be positioned within aperture 222 defined by U-bolt 220 to secure the lashing to a cargo deck. Alternatively, tie-down ring 210 can be rotated along the periphery within aperture 222 to present nominally straight portion 215 not within aperture 222 to accept flat metal banding along nominally straight portion 215. According to this use, curved portion 217 will be positioned within aperture 222 to secure the lashing to a cargo deck.

In operation, a plurality of tie-down assemblies 200, each typically as described above, can be inset into a cargo deck of a vehicle. The tie-down assemblies 200 can be placed in positions appropriate to the adequate retention of the cargo. For example, wherein the cargo carrying vehicle is a truck, a number of tie-downs, perhaps between four and ten, might be recessed at approximately equally spaced positions along both outer edges of the cargo deck. The tie-downs can be secured integrally within the cargo deck and attached, usually by means of welding, to the cargo deck and/or the cargo deck supporting structure.

According to an exemplary embodiment, the tie-down rings 210 can be positioned in their folded down position below the deck surface within the recessed cups 205,. Positioning rings 210 in their folded down position allows the cargo deck to remain free from protuberances. Accordingly, cargo, typically boxed or on pallets, can be positioned on the-deck by sliding if necessary.

Once the cargo is positioned the tie-down rings or bails 210 may be lifted from the folded down position and used to attach webbing, tensioning straps or chains to secure the cargo. As this is done, the pivotal action of the tie-down rings readily permits their alignment with the direction of tension of the lashings. Where flat metal banding is to be used as the cargo retention medium, each tie-down ring 210 may be slid around its periphery through its U-bolt attachment 220 to align the ring's straight edge 215 normal to the banding direction, so that the banding can be passed though the ring, wrapping around the straight portion of the ring, to be doubled back on itself, tensioned and fastened. The webbing, tensioning straps or chains can include a tensioning device such as an "over center buckle" or "ratchet-tensioner" to pre-tension the straps.

The vehicle loader or operator may use as many straps as considered necessary in whatever position is considered the most effective. There are available detailed recommendations on the type, number and pre-tension on the straps for a given cargo type and mass. In some countries aspects of the tie-down methodology are mandatory under the law.

Figure 3:
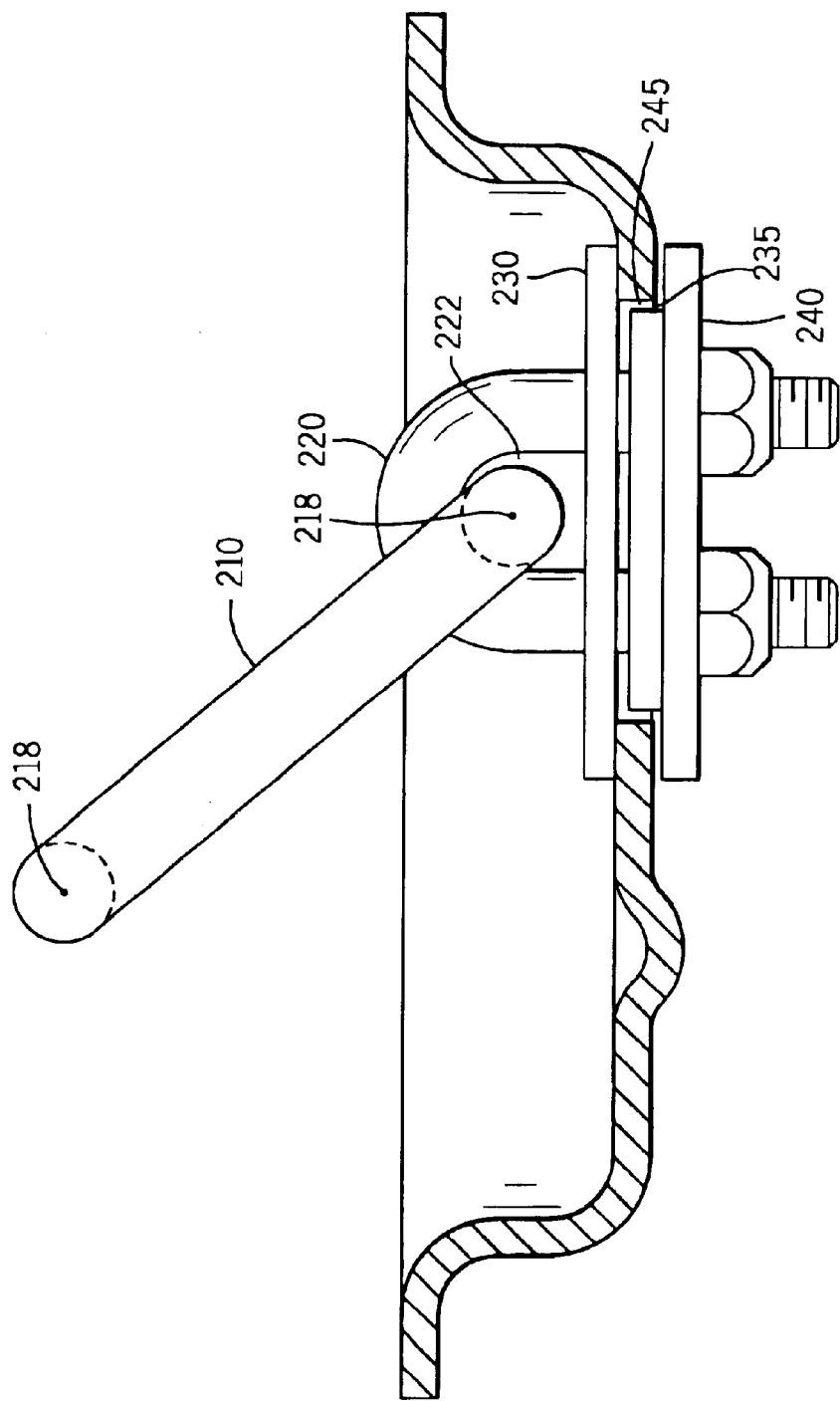
FIG. 3 is a side cut away view of a recessed demountable cargo tie down assembly according to an exemplary embodiment.

Referring to FIG. 3, FIG. 3 is a side view of tie down assembly 200 according to an exemplary embodiment. FIG. 3 illustrates the positioning of the U-bolt retaining washer pack, consisting of washers 230, 235 and 240 within hole 245 such that U-bolt 220 can be rotated along the primary axis perpendicular to the plane defined by hole 245.

FIG. 3 further illustrates tie-down ring 210 positioned within aperture 222 such that tie down ring 210 can be rotated around the axis defined by a centerpoint 218 within the body of tie-down ring 210. The aperture is further configured to allow rotation around its periphery through its attachment at U-bolt 220.

While the exemplary embodiments illustrated in the FIGS. and described above are presently preferred, it should be understood that these embodiments are offered by way of example only. For example, although the tie down assembly is shown as being housed within a recessed cup, any type of housing accommodating the assembly and securing it to a cargo bed can be used. Accordingly, the present invention is not limited to a particular embodiment, but extends to various modifications that nevertheless fall within the scope of the appended claim.

What is claimed is:

1. A cargo tie-down for mounting in the cargo deck of a vehicle comprising:
   a housing recessed within the cargo deck of a vehicle;
   an anchor defining an aperture secured within the housing; and
   a tie-down ring having a nominally circular portion and at least one nominally straight portion compatible with flat metal banding, wherein the tie-down ring is attached to the recessed housing through the aperture in the anchor such that the tie-down ring may be rotated along its periphery within the aperture such that either the nominally circular portion or the nominally straight portion is within the aperture.

2. The cargo tie-down of claim 1, wherein the tie-down ring may be rotated within the aperture about an axis defined by the nominally straight portion of the tie-down ring.

3. The cargo tie-down of claim 1, wherein the anchor may be rotated 360 degrees along a primary axis within the recessed housing.

4. The cargo tie-down of claim 1, wherein the anchor is an inverted U-bolt.

5. The cargo tie-down of claim 4, wherein the U-bolt is secured to the recessed housing through a hole in a floor of the housing larger than the outside width across the legs of the U-bolt.

6. The cargo tie-down of claim 5, wherein the U-bolt is secured by a central washer which is a clearance fit in the hole and which itself is furnished with two holes to accept the U-bolt or shackle bolts, and at least one upper and lower washer having a larger outside diameter than the hole through the housing.

7. The cargo tie-down of claim 5, wherein the U-bolt is secured by at least one flanged or "top hat" washer, where a flange portion of the at least one flanged or "top hat" washer is positioned within the hole in the floor of the housing.

8. The cargo tie-down of claim 1, wherein the anchor is a shackle and bolts.

9. The cargo tie-down of claim 1, wherein the nominally straight portion of the tie down ring is slightly curved inward.

10. The cargo tie-down of claim 1, wherein the recessed housing includes reinforcing ridge or ridges formed in the floor of the housing.

11. The cargo tie-down of claim 10, wherein the reinforcing ridge or ridges are formed as concave channels including one or more drainage holes or apertures to act as drainage gutters for the housing.

12. The cargo tie-down of claim 1, wherein the housing includes an out-turned periphery to secure the housing to a cargo deck.

13. The cargo tie-down of claim 1, wherein the housing includes apertures through the housing for attachment of the cargo tie-down to the vehicle by bolts, rivets, plug-welds or other fasteners.

14. An all-wheel drive vehicle including a cargo bed including at least one recessed cargo tie down comprising:
   the cargo bed including at least one aperture for receiving a recessed cargo tie-down; and
   the recessed cargo tie-down secured within the aperture in the cargo bed; the recessed cargo tie down including
   a housing recessed within the cargo bed of a vehicle;
   an anchor defining an aperture secured within the housing; and
   a tie-down ring having a nominally circular portion and at least one nominally straight portion compatible with flat metal banding, wherein the tie-down ring is attached to the recessed housing through the aperture in the anchor such that the tie-down ring may be rotated along its periphery within the aperture such that either the nominally circular portion or the nominally straight portion is within the aperture.

15. The all wheel drive vehicle of claim 14, wherein the anchor is an inverted U-bolt.

16. The all wheel drive vehicle of claim 15, wherein the U-bolt is secured to the recessed housing through a hole in a floor of the housing larger than the outside width across the legs of the U-bolt.

17. The all wheel drive vehicle of claim 16, wherein the U-bolt is secured by a central washer which is a clearance fit in the hole and which itself is furnished with two holes to accept the U-bolt or shackle bolts, and at least one upper and lower washer having a larger outside diameter than the hole through the housing.

18. The all wheel drive vehicle of claim 17, wherein the U-bolt is secured by at least one flanged or "top hat" washer, where a flange portion of the at least one flanged or "top hat" washer is positioned within the hole in the floor of the housing.

19. A recessed cargo tie-down comprising:
   a ring having a nominally circular portion and at least one nominally straight portion compatible with flat metal banding; and
   anchoring means for anchoring the tie-down ring to a cargo deck of a vehicle such that the tie-down ring may be rotated along its periphery to alternatively present the nominally circular portion or the nominally straight portion external to the anchoring means.

20. The cargo tie-down of claim 19, wherein the anchoring means is removable.

* * * * *